(12) United States Patent
Marengo

(10) Patent No.: US 11,214,023 B2
(45) Date of Patent: Jan. 4, 2022

(54) BAGGING APPARATUS AND METHOD OF BAGGING

(71) Applicant: Rolls-Royce plc, London (GB)

(72) Inventor: Giovanni Antonio Marengo, Derby (GB)

(73) Assignee: Rolls-Royce plc, London (GB)

(*) Notice: Subject to any disclaimer, the term of this patent is extended or adjusted under 35 U.S.C. 154(b) by 445 days.

(21) Appl. No.: 15/566,130

(22) PCT Filed: Apr. 12, 2016

(86) PCT No.: PCT/GB2016/051021
§ 371 (c)(1),
(2) Date: Oct. 12, 2017

(87) PCT Pub. No.: WO2016/166522
PCT Pub. Date: Oct. 20, 2016

(65) Prior Publication Data
US 2018/0111344 A1 Apr. 26, 2018

(30) Foreign Application Priority Data
Apr. 13, 2015 (GB) .................................. 1506182

(51) Int. Cl.
*B29C 70/54* (2006.01)
*B29C 70/34* (2006.01)
(Continued)

(52) U.S. Cl.
CPC .......... *B29C 70/542* (2013.01); *B29C 70/342* (2013.01); *B65B 9/14* (2013.01); *B65B 9/18* (2013.01)

(58) Field of Classification Search
CPC ....... B29C 70/542; B29C 70/342; B65B 9/13; B65B 9/135; B65B 5/108; B65B 9/18; B65B 9/14; B65B 5/045
See application file for complete search history.

(56) References Cited

U.S. PATENT DOCUMENTS 3,738,079 A * 6/1973 Rudman ................. B65B 9/135
53/66
3,738,210 A * 6/1973 Fujio ......................... B65B 9/14
83/175
(Continued)

FOREIGN PATENT DOCUMENTS

CN 103831977 A 6/2016
EP 2902176 A1 8/2015
(Continued)

OTHER PUBLICATIONS

International Patent Application No. PCT/GB2016/051021, International Search Report and Written Opinion dated Jul. 19, 2016, 11 pgs.

(Continued)

*Primary Examiner* — Christopher R Harmon
(74) *Attorney, Agent, or Firm* — Schwegman Lundberg & Woessner, P.A.

(57) ABSTRACT

There is disclosed bagging apparatus (20) for bagging a pre-form (12) for a composite component on a tool (10), the apparatus (20) comprising: a bag dispenser (22) having a store (28) for a tubular vacuum bag (30); and a bag guide (36). In use, a length of tubular vacuum bag material (30) can be drawn from the store (28) radially outwardly over the bag guide (36) and over the tool (10) to form a tube around the pre-form. There is also disclosed a method of bagging a pre-form (12) for a composite component on a tool using the bagging apparatus (20).

12 Claims, 6 Drawing Sheets

(51) Int. Cl.
 *B65B 9/18* (2006.01)
 *B65B 9/14* (2006.01)

(56) References Cited

U.S. PATENT DOCUMENTS

| | | | | |
|---|---|---|---|---|
| 3,975,795 A * | 8/1976 | Kupcikevicius | ........ | A22C 11/02 452/38 |
| 4,016,704 A * | 4/1977 | Fujio | .................... | B29C 31/002 53/399 |
| 4,063,401 A * | 12/1977 | Higgins | ................. | B65B 9/135 53/567 |
| 4,233,797 A * | 11/1980 | Schwarz | .................. | B65B 9/14 53/241 |
| 4,473,990 A * | 10/1984 | Thimon | ................. | B65B 9/135 53/442 |
| 4,493,179 A * | 1/1985 | Brak | ....................... | G21F 7/005 452/35 |
| 4,545,181 A * | 10/1985 | Frankefort | ............ | B29C 63/423 53/459 |
| 4,550,553 A * | 11/1985 | Gaither | .................... | B65B 9/15 53/552 |
| 4,592,469 A * | 6/1986 | Gaither | .................... | B65B 9/15 206/395 |
| 4,888,937 A * | 12/1989 | Glenn | ..................... | A01F 25/14 53/567 |
| 4,934,529 A * | 6/1990 | Richards | .................. | B65B 9/15 206/303 |
| 5,385,002 A * | 1/1995 | Cundall | .................. | A01F 25/14 53/441 |
| 5,590,512 A * | 1/1997 | Richards | .................. | B65B 9/15 53/370 |
| 5,782,061 A * | 7/1998 | Clazie | ...................... | B65B 9/15 53/451 |
| 5,899,049 A * | 5/1999 | Fuss | ......................... | B65B 9/15 53/261 |
| 6,032,439 A * | 3/2000 | Birkenfeld | ............. | B65B 9/135 53/441 |
| 6,045,651 A | 4/2000 | Kline et al. | | |
| 6,052,972 A * | 4/2000 | Rea | ......................... | B65B 9/15 53/390 |
| 6,298,636 B1 * | 10/2001 | Lachenmeier | ......... | B65B 9/135 53/442 |
| 6,336,986 B1 | 1/2002 | Lee et al. | | |
| 6,560,948 B1 * | 5/2003 | Fuss | .......................... | B65B 9/15 53/459 |
| 6,776,074 B1 * | 8/2004 | Tisi | ........................ | B26D 3/164 53/457 |
| 6,824,846 B1 * | 11/2004 | Meixner | ................... | B65B 9/15 428/34.8 |
| 6,865,865 B2 * | 3/2005 | Hannen | ................... | B65B 9/135 53/567 |
| 6,892,768 B1 * | 5/2005 | Ours | ......................... | B65B 9/14 141/10 |
| 7,335,012 B2 * | 2/2008 | Blanton | ................. | B29C 33/48 156/245 |
| 7,503,368 B2 * | 3/2009 | Chapman | ............... | B29C 70/323 156/425 |
| 8,302,635 B2 * | 11/2012 | Bohler | ................. | B65G 69/183 141/10 |
| 8,875,480 B2 * | 11/2014 | Czok | ....................... | B65B 9/135 53/474 |
| 2003/0084649 A1 * | 5/2003 | Heil | ....................... | A47F 13/085 53/512 |
| 2005/0016890 A1 * | 1/2005 | Tannock | ................... | B65B 9/18 206/497 |
| 2005/0193691 A1 * | 9/2005 | Stravitz | ..................... | B65B 9/15 53/567 |
| 2007/0205209 A1 * | 9/2007 | Arnold | ...................... | B65B 9/15 220/890 |
| 2008/0048369 A1 | 2/2008 | Kulesha | | |
| 2008/0098691 A1 * | 5/2008 | Pinto | ........................ | B65B 9/15 53/138.2 |
| 2010/0287883 A1 * | 11/2010 | May | ..................... | A22C 11/005 53/436 |
| 2012/0073250 A1 * | 3/2012 | Cudworth | ............... | B65F 1/062 53/545 |
| 2012/0168012 A1 | 7/2012 | Statler, III et al. | | |
| 2016/0221703 A1 * | 8/2016 | Fenn | ........................ | B65B 59/04 |

FOREIGN PATENT DOCUMENTS

FR 2879497 8/2015
WO WO-2014/070341 A1 8/2014

OTHER PUBLICATIONS

United Kingdom Patent Application No. 1506182.3, Search Report dated Sep. 30, 2015, 3 pgs.

* cited by examiner

BAGGING APPARATUS AND METHOD OF BAGGING

This application is a U.S. National Stage Filing under 35 U.S.C. 371 from International Application No. PCT/GB2016/051021, filed on Apr. 12, 2016, and published as WO 2016/166522 A1 on Oct. 20, 2016, which claims the benefit of priority under 35 U.S.C. § 119 to United Kingdom Patent Application No. 1506182.3, filed on Apr. 13, 2015, each of which is hereby incorporated by reference herein in its entirety.

The invention relates to bagging apparatus, in particular, bagging apparatus for bagging a pre-form for a composite component on a tool with a tubular vacuum bag.

Composite materials are increasingly used for components that require particular combinations of material properties. In particular, composite materials such as Carbon Fibre Reinforced Polymer (CFRP) are commonly used for components in the aerospace and other industries due to their high stiffness and low weight.

In the manufacture of composite components, it is common to subject a pre-form for a component to a partial vacuum during either forming or curing. To apply the vacuum, a vacuum bag is disposed over and sealed around a pre-form for the component supported on a tool. Air is then drawn from between the bag and the tool so as to subject the pre-form to a partial vacuum. An unbalanced pressure force therefore acts against the tool, for example, a pressure force of between 5 kPa and 100 kPa.

Different shapes and sizes of bags are used for different components, and it is known to procure custom bags for particular components and tools. For example, it is known to use a tubular vacuum bag for components supported on a mandrel.

It is desirable to minimise the size of a tubular bag so that it fits over the pre-form on the tool or mandrel with minimal clearance, so as to reduce the requirement to fold or pleat the bag as it is secured in place over the pre-form. However, it can be difficult to place the bag over the pre-form so that it surrounds it without snagging the pre-form, ripping the bag or getting the bag stuck on the pre-form or tool.

It can be particularly difficult to place a tubular bag over pre-forms for large components, such as fan casings for gas turbine engines.

Accordingly, it is desirable to provide an improved process and apparatus for bagging a pre-form on a tool with a tubular vacuum bag.

According to a first aspect of the invention there is provided bagging apparatus for bagging a pre-form for a composite component on a tool, the apparatus comprising: a bag dispenser having a store for tubular vacuum bag material; and a bag guide;

wherein in use, a length of tubular vacuum bag material can be drawn from the store radially outwardly over the bag guide and over the tool to form a tube around the pre-form.

The store may be an annular store, and in use, tubular bagging material may be stored within the annular store as an annulus.

The bag dispenser may have an annular bag opening from which a length of tubular vacuum bag material can be drawn. The bag guide may be formed by the edge of the annular bag opening.

The bag dispenser may define a tool opening such that the bag dispenser can surround the tool and be moved over an axial length of the tool. The bag dispenser may be substantially annular.

The guide may comprise a curved lip or edge of the bag opening. The guide may be coupled to or integrally formed with the bag dispenser. The guide may comprise a series of feed rollers adjacent the bag opening.

The bagging apparatus may further comprise a bag retainer for retaining an end of the tubular vacuum bag material extending from the bag dispenser. At least one of the bag dispenser and the bag retainer may be arranged to surround the tool, and to be moved over an axial length of the tool relative the other to draw a length of tubular vacuum bag material out of the bag dispenser to form a tube around the pre-form.

The bag retainer may be arranged to surround the tool and to move over an axial length of the tool. The bag retainer may be substantially annular. The bag retainer may have a central opening such that the bag retainer can surround the tool and be moved over an axial length of the tool. The bag retainer may comprise an annular ring which can surround the tool and be moved over an axial length of the tool.

The bag retainer may comprise a plurality of discrete retaining elements. The retaining elements may not be coupled to one another. The retaining elements may be independently movable. The retaining elements may be fixed to a support structure, such as a jig, a work surface or the floor of the environment of the bagging apparatus.

The bagging apparatus may further comprise a coupling mechanism for releasably coupling the bag retainer to the bag dispenser such that when coupled, they are constrained to move together.

The bag dispenser and/or the bag retainer may comprise one or more mounting portions for mounting to the tool or a support structure for the tool. The mounting portion may be for mounting to a structure fixed relative the tool.

The bagging apparatus may further comprise a support structure for positioning and/or axially moving the bag dispenser and/or the bag retainer with respect to the tool. The support structure may be a crane or hoist, such as a cable gantry, arranged to raise and lower the bag dispenser and/or the bag retainer relative the tool.

The bagging apparatus may further comprise an alignment means for guiding axial movement of a component of the bagging apparatus relative to the tool in a bagging operation. The axially moving component of the tool may be the bag dispenser or a bag retainer. The alignment means may comprise axially extending guides. The axially extending guides may extend from the bag dispenser and/or the bag retainer.

The alignment means may comprise a projector for projecting an alignment indicator on a surface of the environment of the bagging apparatus. For example, the alignment indicator may be a spot, line, curve, image or other graphic projected on the floor or ceiling of a workspace. The alignment means may be coupled to the component of the bagging apparatus that is arranged to move axially over the tool, for example, the bag dispenser and/or the bag retainer.

The alignment means may comprise a first projector coupled to the bag dispenser for projecting a first alignment indicator and a second projector coupled to the bag retainer for projecting a second alignment indicator. The alignment means may be configured so that alignment of the first and second indicators corresponds to coaxial arrangement of the bag dispenser and the bag retainer.

The alignment projectors may be indirectly coupled to the bag dispenser or the bag retainer. For example, the alignment projector may be mounted on a support structure for the bag dispenser.

The alignment means may comprise a level sensor arranged to indicate, for example via a visual display or an alarm, when the orientation of the bag dispenser or bag retainer to which it is coupled deviates from a predetermined orientation. For example, the level sensor may be coupled to a substantially annular bag dispenser and the axial direction of movement of the bag dispenser may be substantially vertical. The predetermined orientation of the bag dispenser may therefore be a substantially horizontal orientation.

According to a second aspect of the invention there is provided a method of bagging a pre-form for a composite component on a tool using bagging apparatus in accordance with the first aspect of the invention, the method comprising: positioning the bag dispenser at a first axial position with respect to an axis of the tool; drawing a length of tubular vacuum bag material from the annular store of the bag dispenser radially outwardly over the bag guide to form a tube around the pre-form in a bagging operation.

The bagging apparatus may comprise a bag retainer and the method may comprise moving one of the bag dispenser and the bag retainer over an axial length of the tool relative the other to draw a length of tubular vacuum bag material out of the bag dispenser to form a tube around the pre-form in a bagging operation.

The bag dispenser and the bag retainer may be coupled and constrained to move together when positioned at the first axial position, and they may be decoupled from each other before commencing the bagging operation.

One of the bag dispenser and the bag retainer may be releasably mounted to the tool at the first axial position before commencing the bagging operation.

The method may further comprise disengaging the tubular vacuum bag material from the bag retainer.

The method may further comprise adhering the tubular vacuum bag to the tool at a first seal position adjacent a first axial end of the component formed on the tool and adhering the tubular vacuum bag to the tool at a second seal position adjacent an opposing second axial end of the component. The method may further comprise the step of applying an adhesive tape to the tool before adhering the tubular vacuum bag at the first and second seal positions.

The method may further comprise cutting a dispensed portion of the tubular vacuum bag away from a portion of the tubular vacuum bag within the bag cassette.

The invention will now be described, by way of example, by reference to the following drawings, in which:

FIG. 1 schematically shows a bagging apparatus according to an embodiment of the invention disposed above a tool and composite pre-form;

Figure 1:
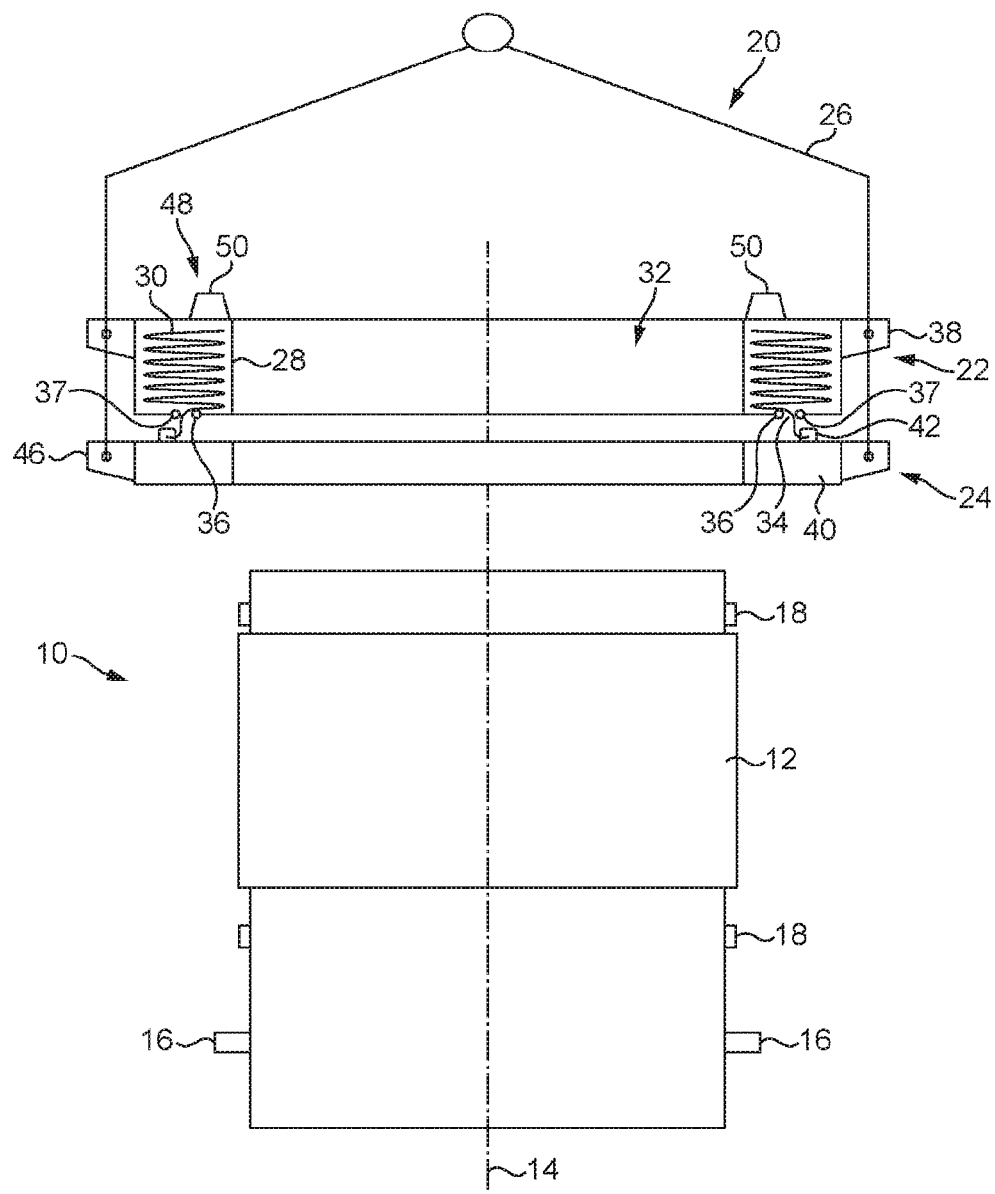

FIG. 1 shows a substantially cylindrical tool 10 for laying up a pre-form for a composite casing for a gas turbine engine, and a substantially cylindrical composite pre-form 12 which has been formed on the surface of the tool by a composite layup process. The tool is oriented so that its central axis 14 extends substantially vertically, and one end of the tool 10 is supported on a substantially horizontal floor or platform (not shown).

The tool 10 is provided with a plurality of support lugs 16 towards its lower end that project radially outwardly from the cylindrical surface of the tool 10, and each have an axially extending threaded through-hole (not shown) for receiving a bolt, as will be described in detail below. In this embodiment, there are four angularly spaced support lugs 16, but in other embodiments, there may be more or less.

The tool 10 is also shown prepared with two annular strips of adhesive bagging tape 18 extending around the cylindrical surface of the tool 10 above and below the pre-form 12 respectively.

FIG. 1 also shows a bagging apparatus 20 disposed above the tool 10 in an initial configuration. The bagging apparatus 20 comprises a bag dispenser 22 and a bag retainer 24 supported by a cable gantry 26 for lowering and raising the bag dispenser 22 and bag retainer 24. In the initial configuration, the bag dispenser 22 is supported on the bag retainer 24, which itself is held by the cable gantry 26.

The bag dispenser 22 comprises an annular bag housing 28 in which there is disposed a folded tubular vacuum bag 30. The folded tubular vacuum bag 30 takes the form of an annulus, or concertinaed tube. The bag dispenser 22 defines a central circular opening 32 which allows the bag dispenser 22 to move axially over any tool and corresponding pre-form of lesser diameter.

The lower side of the bag housing 28 has an annular bag opening 34 for dispensing the tubular vacuum bag 30. The bag opening 34 is provided with a bag guide 36 in the form of annular rounded lips on the radially inner edge of the bag opening. The guide 36 is arranged to direct the vacuum bag 30 smoothly through the opening without catching at a radially outer position with respect to the guide 36. Accordingly, the guide 36 is arranged so that the vacuum bag 30 exits the bag housing 28 in the form of a tube having a diameter of at least the diameter of the guide 36, and the guide 36 is disposed within (i.e. radially inwardly of) the tube. In other embodiments, the bag guide 36 may take any suitable form. For example, the bag guide may comprise a plurality of discrete rollers angularly spaced around the bag opening 30. Further, an opposing bag guide 37 is provided on the radially outer side of the bag opening 34 to prevent the vacuum bag 30 from catching on the side of the housing 28 of opening 34. The bag dispenser 22 is also provided with a plurality of angularly spaced support portions 38 by which the bag dispenser can be suspended from cabling of the cable gantry 26. In this embodiments, there are four angularly spaced support portions 38.

The bag retainer 24 is disposed below the bag dispenser 22 and coaxially aligned with the bag dispenser 22 and the axis 14 of the tool. The bag retainer 24 comprises a substantially annular support ring 40 provided with a retaining means 42 for retaining the tubular end of the tubular vacuum bag 30 that extends from the bag opening 30 of the bag dispenser 22. In this embodiment, the retaining means comprises a plurality of angularly spaced clamps 42 that are each arranged to clamp a portion of the tubular end of the bag. In other embodiments, the retaining means may take any other suitable form. The bag retainer 24 has a central circular opening 44 which allows the bag retainer 24 to move axially over any tool and corresponding pre-form of lesser diameter.

The bag retainer 24 is provided with support portions 46 which are similar to the support portions 38 of the bag dispenser 22. The bag retainer 24 further comprises axial threaded holes arranged to align with the support lugs 16 of the tool 10 for coupling the bag retainer 24 to the tool 10, as will be described below.

The cable gantry 26 is a conventional cable support system for raising and lowering the bag dispenser 22 and the bag retainer 24. In this embodiment, the cable gantry 26 comprises four synchronously extendible and retractable cables which can be coupled to the support portions 46 of the bag retainer and/or the support portions 38 of the bag dispenser 22. The cable gantry 26 is also laterally movable to align the bag dispenser 22 and bag retainer 24 with the axis 14 of the tool 10.

The bagging apparatus further comprises an alignment system 48. In this embodiment, the alignment system 48 comprises two alignment projectors 50 disposed on the upper surface of the bag dispenser 22 and arranged to project respective alignment graphics onto the ceiling of the workshop space where the bagging apparatus is used, as will be described in detail below.

A method of bagging a pre-form for a composite component on a tool will now be described, by way of example.

The bagging apparatus is prepared in the initial configuration shown in FIG. 1, in which the bag dispenser 22 and bag retainer 24 are coaxially aligned with each other and the axis 14 of the tool 10 and are disposed above the tool 10. The cables of the cable gantry extend through the support portions 38 of the bag dispenser 22 and are coupled to the support portions 44 of the bag retainer 24, and the bag dispenser 22 is directly supported on the bag retainer 24. In this initial configuration, a short portion of the tubular vacuum bag extends from the bag dispenser 22 and is retained by the bag retainer 24.

Confirmation of coaxial alignment with the tool 12 is provided by activating the alignment projectors 50 and determining whether the alignment graphics projected on a surrounding structure, such as the ceiling of the workshop space, align with corresponding marks formed thereon that correspond to the fixed position of the tool 10 and the desired position of the alignment projectors. In this embodiment, the alignment projectors 50 are arranged to project the alignment graphics along a direction parallel with the axis of the tool 10.

Figure 2:
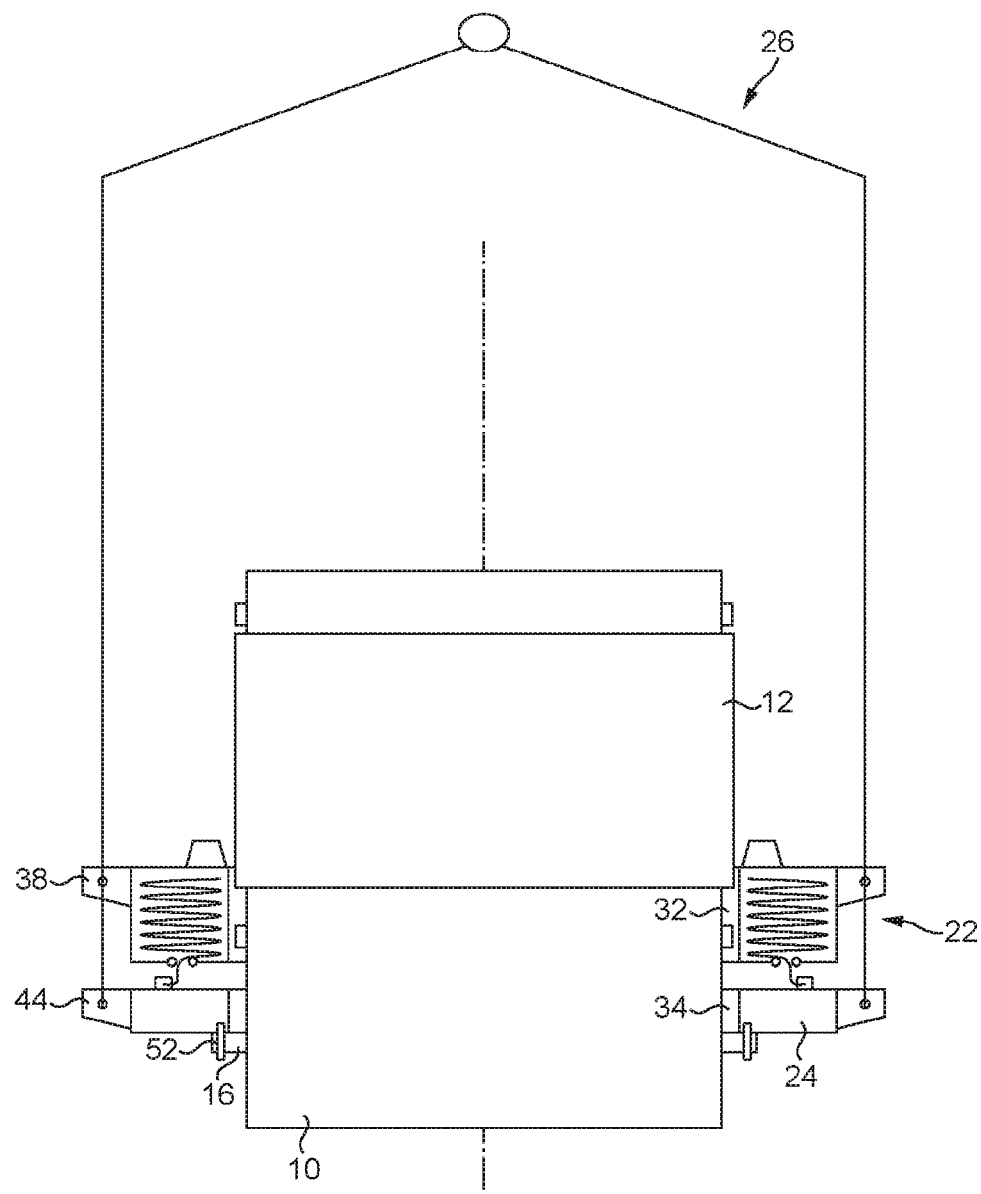
FIG. 2 shows the bagging apparatus of FIG. 1 lowered over the tool.

The cables of the cable gantry 26 are then extended as shown in FIG. 2 so that the bag dispenser 22 and bag retainer move axially over the tool 10 and the tool 10 is received in the central openings 32, 34 of the bag dispenser 22 and bag retainer 24 respectively.

The bag retainer 24 is then mounted to the tool 10 by bolts 52 extending through the axial threaded holes formed in the support lugs 16 and the underside of the bag retainer respectively. The bag retainer 24 is therefore supported on the tool 10 via the lugs 16.

Figure 3:
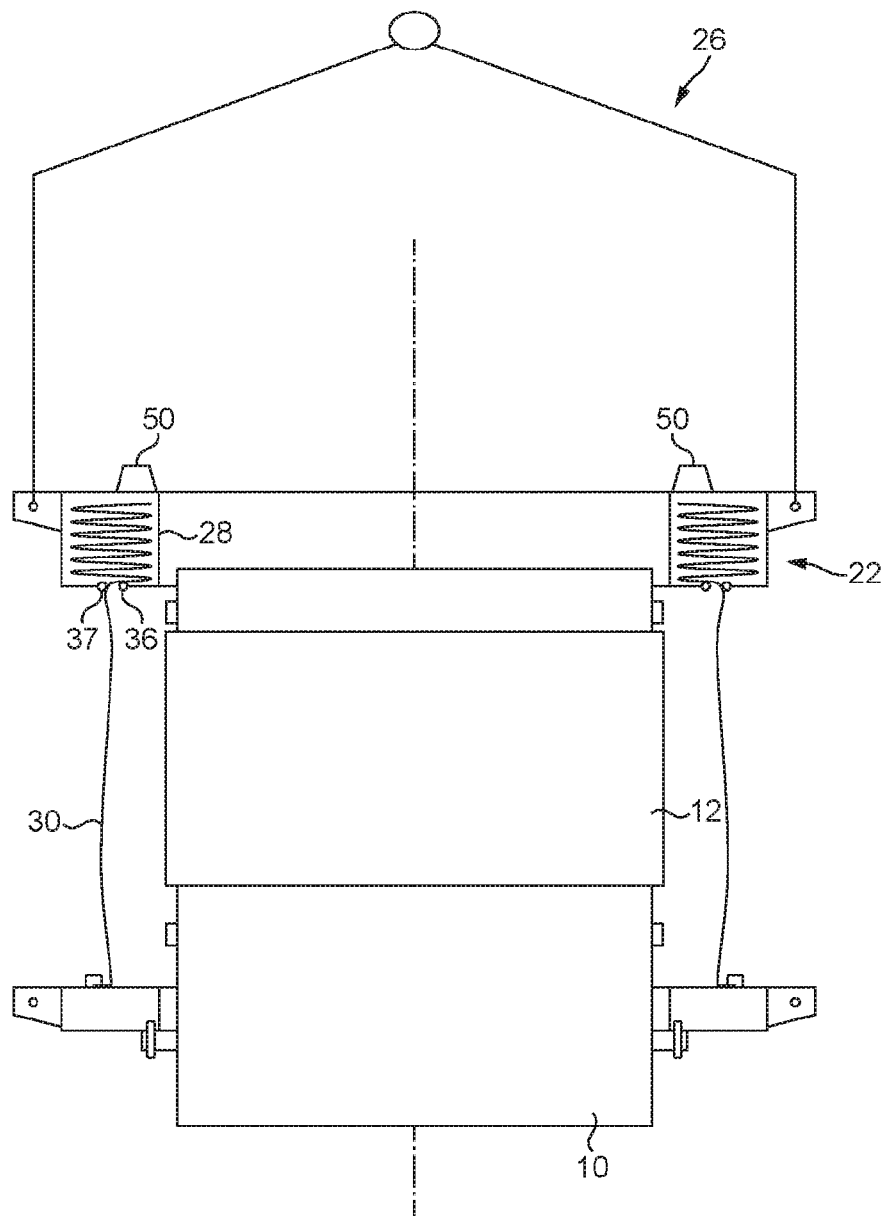
FIG. 3 shows the bagging apparatus of FIG. 1 with the bag dispenser raised relative the bag retainer.

As shown in FIG. 3, the cables are decoupled from the support portions 44 of the bag retainer 24 and are coupled directly to the support portions 38 of the bag dispenser 22 alone. The bag dispenser 22 is carefully drawn upwards by retracting the cables of the cable gantry 26. As the bag dispenser 22 is drawn upwardly, the alignment of the bag dispenser 22 with the tool 10 is checked by monitoring the alignment of the alignment graphics projected by the alignment projectors 50 with the corresponding marks provided on the ceiling of the workshop.

As the bag dispenser 22 is drawn upwardly, the tubular vacuum bag 30 is drawn out of the bag housing 28 to surround the pre-form on the tool along at least the length of the pre-form 12.

Figure 4:
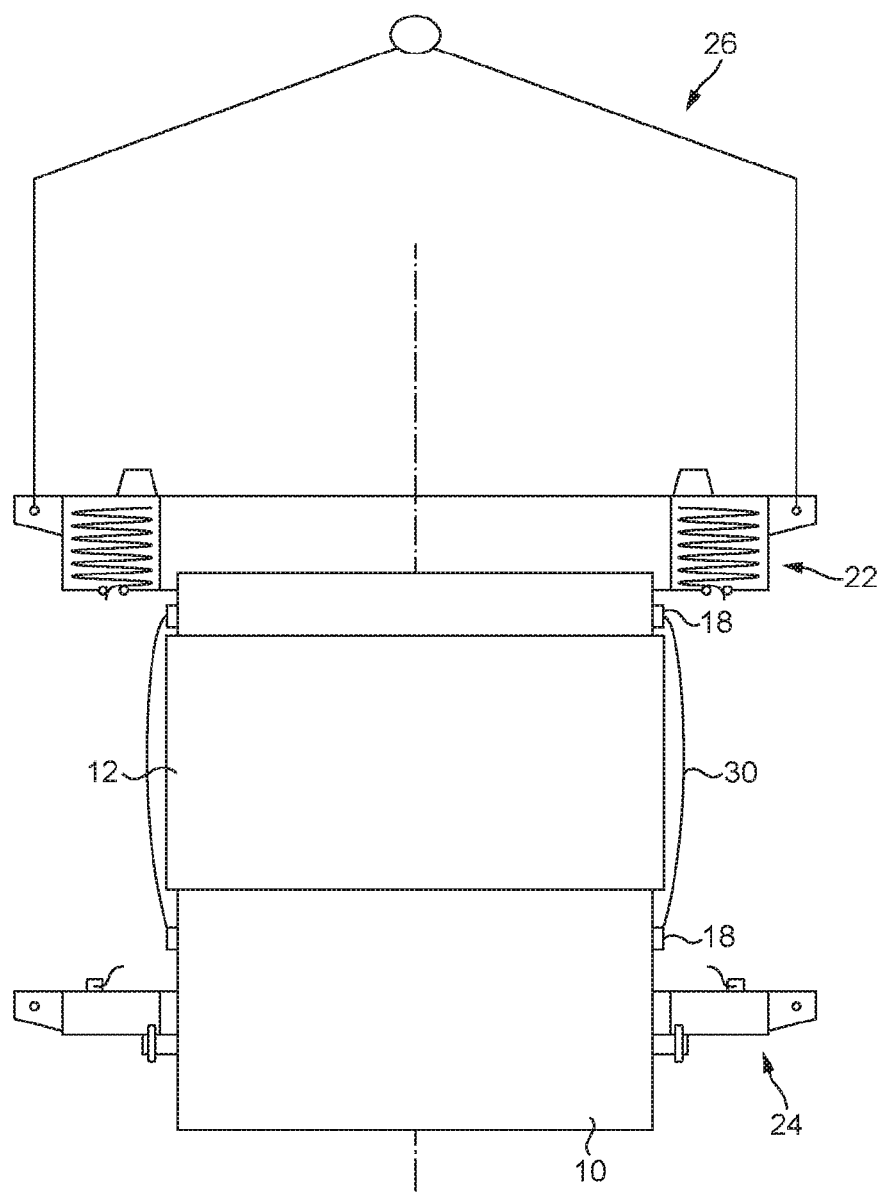
FIG. 4 shows the bagging apparatus of FIG. 1 with the bag cut from the bag dispenser and bag retainer, and coupled to the tool.

As shown in FIG. 4, the tubular vacuum bag 30 surrounding the pre-form 12 on the tool 10 is cut towards its upper and lower ends adjacent to the bag dispenser 22 and bag retainer 24 respectively, and the cut tubular portion of the bag 30 is manually adhered to the strips of bagging tape 18 either side of the pre-form 12 formed on the tool. The pre-form 12 is therefore sealed between the cylindrical surface of the tool 10 and the cut portion of vacuum bag 30.

Figure 5:
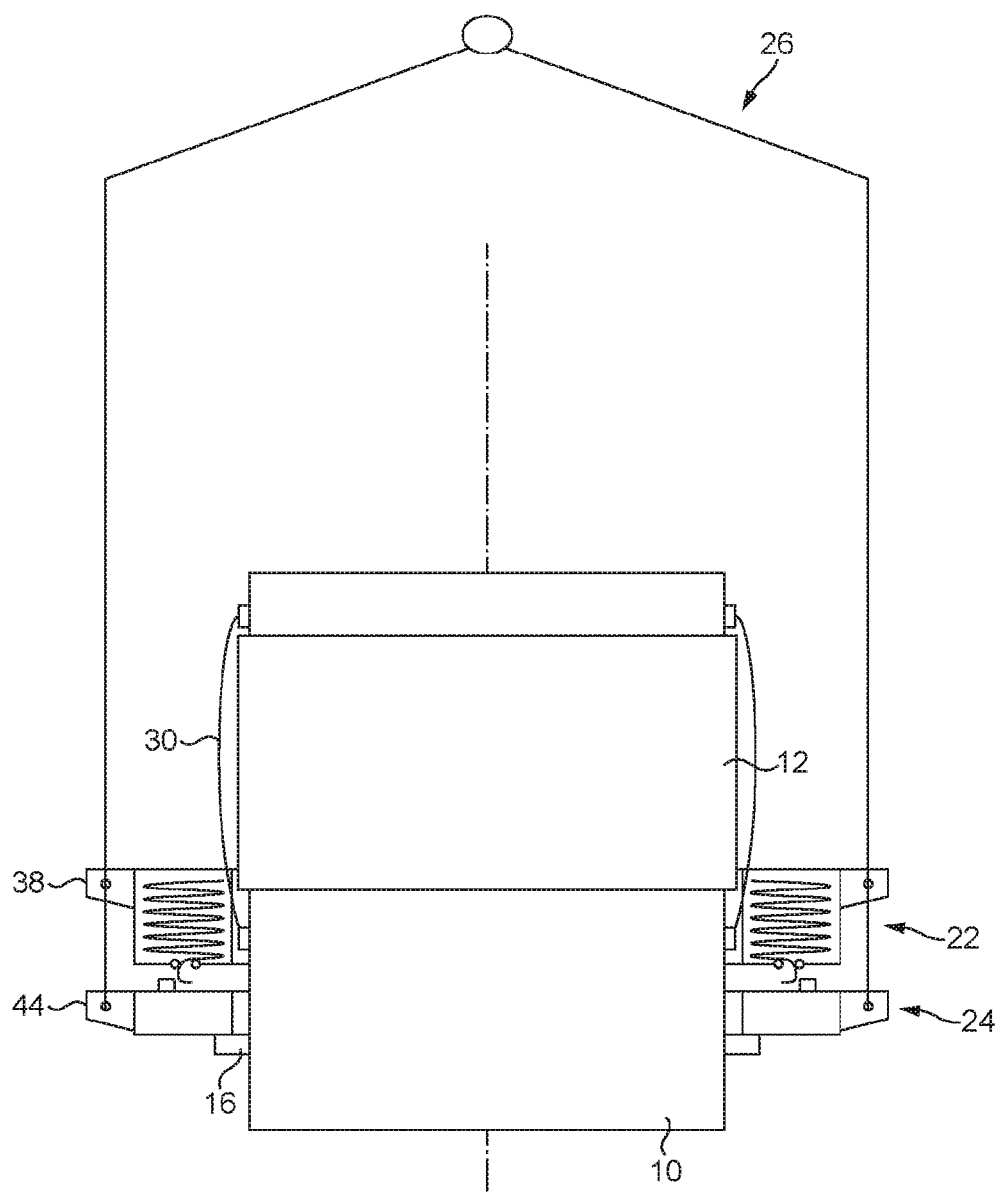
FIG. 5 shows the bagging apparatus of FIG. 1 with the bag dispenser lowered over the tool to rest on the bag retainer.

As shown in FIG. 5, the cables of the cable gantry 26 are extended to lower the bag dispenser 22 back over the tool 10, pre-form 12 and the cut portion of the tubular vacuum bag 30 so as to rest on the bag retainer 22. The cables of the cable gantry are then coupled to the support portions 44 of the bag retainer 22 in preparation for lifting both the bag retainer 24 and bag dispenser 22 from the tool 10. Once coupled to the support portions 44 of the bag retainer 22, the cables of the cable gantry 26 are tensioned so that the cable gantry takes the weight of the bag retainer 22, and the bolts 52 coupling the bag retainer 22 to the tool 10 are removed.

Figure 6:
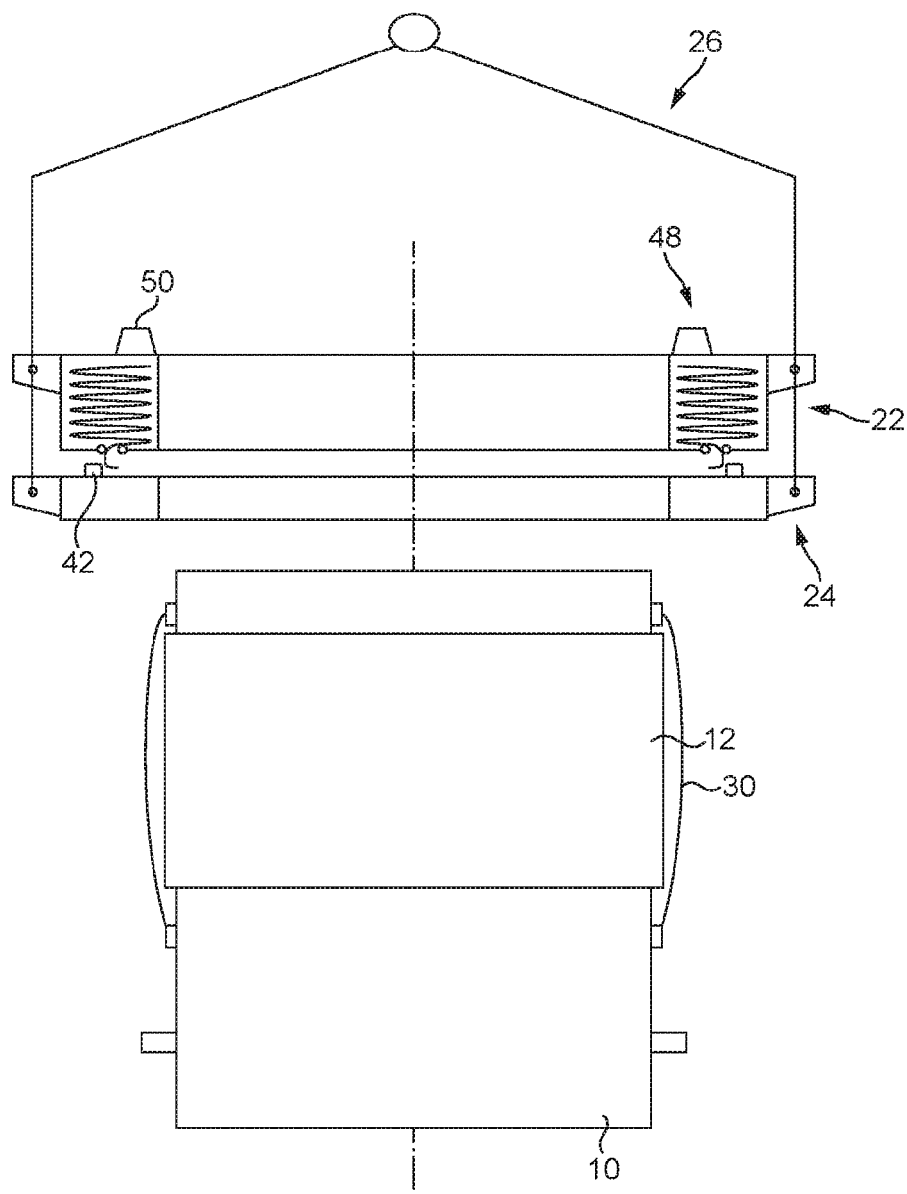
FIG. 6 shows the bagging apparatus of FIG. 1 withdrawn from the tool.

As shown in FIG. 6, the cables of the cable gantry 26 are retracted so as to lift the bag retainer 24 and bag dispenser 22 axially upwardly over the tool 10, pre-form 12 and the cut portion of the tubular bag 30 to a position clear of the tool 10. As described above, the axial and lateral alignment of the bag dispenser 22 and bag retainer 24 relative the tool 10 is monitored during lifting using the alignment projectors 50 of the alignment system 48.

Any residual portion of tubular vacuum bag 30 is then removed from the bag retainer 24, and a new end portion of the bag extending from the bag dispenser 22 is again coupled to the bag retainer by the clamps 42. The bagging apparatus 20 is thus returned to its initial configuration as shown in FIG. 1, and is ready for a subsequent bagging operation.

The bagging apparatus of the invention allows an operator to easily bag a pre-form on a tool. In particular, the tubular vacuum bag is kept relatively taught between the bag dispenser and bag retainer during the bagging operation, and is retained at either end by at positions radially outward of the tool (and outward of the pre-form on the tool). Consequently, the vacuum bag does not deflect or deform radially inwardly to contact or snag on the tool or the pre-form, but is held in a radially outward position of the pre-form and the tool.

The bag dispenser and/or the bag retainer can be moved steadily and carefully using the cable gantry, and the alignment of the apparatus relative the tool can be monitored and corrected using the alignment system to ensure the bag is not deflected laterally towards the pre-form or tool.

The bagging apparatus may improve the success rate of bagging operations and the speed in which a bagging operation can be conducted. Further, the bagging apparatus may allow a bagging operation to be conducted by two operators or possibly even one operator. In contrast, the applicant has found that manually bagging a large component, such as a casing for a gas turbine engine, may take three or more operators and can be an awkward and error-prone procedure.

Although it has been described that the tool is provided with support lugs and the bag retainer or bag dispenser of the bagging apparatus is arranged to be coupled to the tool by the support lugs, it will be appreciated that in other embodiments the bag retainer or bag dispenser may be coupled to the tool in other ways. For example, the bag retainer or bag dispenser may be provided with a radially extending bolt that can be driven radially inwardly against the surface of the tool to couple the bag retainer or bag dispenser to the tool.

Although an embodiment of the invention has been described in which the bag retainer comprises an annular support ring and retaining means in the form of a plurality of clamps, it will be appreciated that in other embodiments the bag retainer may take other forms. For example, the bag retainer may comprises a plurality of discrete retaining elements coupled to a static structure, such as a support for the tool, a floor or platform supporting the tool, or some other support structure. In use, the bag dispenser may be lowered over the tool towards the bag retainer, the bag may then be retained by the retainer, and the bag dispenser may be lifted away from the bag retainer to draw the tubular vacuum bag relative to the tool. The bag retainer may be fixed relative to the tool. In a further example, the bag retainer may comprises a ring, such as a flexible ring, provided with clips and/or other fasteners for fastening to the tubular end of the bag. In further embodiments of the invention, there may be no bag retainer, and one tubular end of the bag may be coupled to the tool by way of bagging tape and the bag dispenser may be drawn away from the bagging tape to draw the tubular vacuum bag out of the bag dispenser.

Although an embodiment of the invention has been described in which the bag dispenser is supported on the bag retainer, and both the bag dispenser and the bag retainer move together when the bag retainer is coupled to the cable gantry, it will be appreciated that in other embodiments the bag dispenser and bag retainer may be attached to independent cable systems or other actuation systems so that they can move axially independently of one another.

The invention claimed is:

1. Bagging apparatus for bagging a pre-form for a composite component on a tool, the apparatus comprising:
a bag dispenser having a store for tubular vacuum bag material;
a bag guide;
a length of tubular vacuum bag material that is configured, in use, to be drawn from the store radially outwardly over the bag guide and over the tool to form a tube around the pre-form; and
a bag retainer for clamping an end of the tubular vacuum bag material extending from the bag dispenser;
wherein the bag dispenser comprises a bag opening facing the bag retainer for dispensing the tubular vacuum bag material, wherein the bag dispenser defines a tool opening such that the bag dispenser can surround the tool and be moved over an axial length of the tool, and wherein the bag guide is formed by an edge defining the bag opening, and at least one of the bag dispenser and the bag retainer is arranged to surround the tool, and to be moved over an axial length of the tool relative the other to draw a length of tubular vacuum bag material out of the bag dispenser to form a tube around the pre-form.

2. Bagging apparatus according to claim 1, wherein the store is an annular store, and. wherein in use, tubular bagging material is stored within the annular store as an annulus.

3. Bagging apparatus according to claim 1, wherein the bag opening from which a length of tubular vacuum bag material can be drawn is annular.

4. Bagging apparatus according to claim 1, wherein the bag dispenser is annular.

5. Bagging apparatus according to claim 1, further comprising a coupling mechanism for releasably coupling the bag retainer to the bag dispenser such that when coupled, they are constrained to move together.

6. Bagging apparatus according to claim 1, wherein the bag dispenser and/or the bag retainer comprises one or more mounting portions for mounting to the tool or a support structure for the tool.

7. Bagging apparatus according to claim 1, wherein the bag retainer comprises an annular ring which can surround the tool and be moved over an axial length of the tool.

8. Bagging apparatus according to claim 1, further comprising an alignment means for guiding axial movement of a component of the bagging apparatus relative to the tool in a bagging operation.

9. Bagging apparatus according to claim 8, wherein the alignment means comprises a projector for projecting an alignment indicator on a surface within the environment of the bagging apparatus.

10. Bagging apparatus for bagging a pre-form for a composite component on a tool, the apparatus comprising:
a bag dispenser having a store for tubular vacuum bag material;
a bag guide;
a length of tubular vacuum bag material that is configured, in use, to be drawn from the store radially outwardly over the bag guide and over the tool to form a tube around the pre-form; and
a bag retainer for clamping an end of the tubular vacuum bag material extending from the bag dispenser;
a coupling mechanism for releasably coupling the bag retainer to the bag dispenser such that when coupled, they are constrained to move together;
wherein the bag dispenser comprises a bag opening facing the bag retainer for dispensing the tubular vacuum bag material wherein the bag guide is formed by an edge defining the bag opening, and at least one of the hag dispenser and the bag retainer is arranged to surround the tool, and to be moved over an axial length of the tool relative the other to draw a length of tubular vacuum bag material out of the bag dispenser to form a tube around the pre-form.

11. A method of bagging a pre-form for a composite component on a tool using a bagging apparatus, the method comprising:
positioning a bag dispenser at a first axial position with respect to an axis of the tool;
drawing a length of tubular vacuum bag material through a bag opening from an annular store of the bag dispenser radially outwardly over a bag guide formed by an edge defining the bag opening to form a tube around the pre-form in a bagging operation;
wherein the bagging apparatus comprises a bag retainer configured to clamp an end of the tubular vacuum bag material, and wherein the method comprises moving one of the bag dispenser and the bag retainer over an axial length of the tool relative the other to draw a length of tubular vacuum bag material out of the bag dispenser through the bag opening in the bag dispenser facing the bag retainer, to form a tube around the pre-form in a bagging operation,
wherein the bag dispenser and the bag retainer are coupled and constrained to move together when positioned at the first axial position and wherein they are decoupled from each other before commencing the bagging operation.

12. A method according to claim 11, wherein one of the bag dispenser and the bag retainer is releasably mounted to the tool at the first axial position before commencing the bagging operation.

* * * * *

UNITED STATES PATENT AND TRADEMARK OFFICE
CERTIFICATE OF CORRECTION

PATENT NO. : 11,214,023 B2  
APPLICATION NO. : 15/566130  
DATED : January 4, 2022  
INVENTOR(S) : Giovanni Antonio Marengo Page 1 of 1

It is certified that error appears in the above-identified patent and that said Letters Patent is hereby corrected as shown below:

In the Claims

In Column 7, Line 56, in Claim 2, delete "and." and insert --and-- therefor

In Column 8, Line 32, in Claim 10, delete "hag" and insert --bag-- therefor

In Column 8, Line 56, in Claim 11, delete "operation," and insert --operation;-- therefor In Column 8, Line 59, in Claim 11, after "position", insert --,--

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*